United States Patent [19]

Engler et al.

[11] Patent Number: 5,458,901
[45] Date of Patent: Oct. 17, 1995

[54] PROCESS FOR STERILIZING MEAT AND POULTRY

[75] Inventors: Sidney Engler, Holland Landing; Clay Palbiski, Corbeil, both of Canada

[73] Assignee: Liquid Carbonic Inc., Scarborough, Canada

[21] Appl. No.: 285,464

[22] Filed: Aug. 3, 1994

[51] Int. Cl.[6] .................................................. A23L 3/00
[52] U.S. Cl. .......................................... 426/521; 426/644
[58] Field of Search ................................ 426/521, 332, 426/335, 474, 644; 422/1, 28

[56] References Cited

U.S. PATENT DOCUMENTS

| | | | |
|---|---|---|---|
| 1,524,494 | 1/1925 | Warth | 422/28 |
| 1,920,026 | 7/1933 | Tischler | 422/29 |
| 2,069,820 | 2/1937 | Dodge | 422/33 |
| 2,271,171 | 1/1942 | de Mol | 422/33 |
| 3,454,406 | 7/1959 | Alderton | 422/28 |
| 4,361,536 | 11/1982 | Leopardi | 422/33 |
| 4,824,686 | 4/1989 | Dunn et al. | 426/335 |
| 4,849,237 | 7/1989 | Hurst | 426/332 |
| 4,889,708 | 12/1989 | Latif et al. | 422/28 |

FOREIGN PATENT DOCUMENTS 2520592  8/1983  France ................................ 426/332

*Primary Examiner*—George Yeung
*Attorney, Agent, or Firm*—Arne I. Fors; D. Doak Horne; Jeffrey T. Imai

[57] ABSTRACT

A process is provided to effectively sterilize and coincidentally tenderize fresh meat and poultry. Bacteria such as salmonella on fresh meat and poultry are effectively killed when exposed to $CO_2$ gas under pressure in a pressure vessel followed by rapid depressurization. Gas in the pressure vessel preferably is withdrawn to create a vacuum prior to introduction of $CO_2$ gas.

9 Claims, 1 Drawing Sheet

PROCESS FOR STERILIZING MEAT AND POULTRY

BACKGROUND OF THE INVENTION

This invention relates to the sterilization of meat and poultry and, more particularly, relates to a process wherein bacteria on meat and fresh poultry are substantially killed by exposure to $CO_2$ gas under pressure, followed by rapid depressurization.

In North America, the consumption of low fat chicken and other poultry is on the rise notwithstanding the fact that the presence of salmonella and other potentially harmful bacteria on poultry are common. Accordingly, the reported cases of salmonella food poisoning are also increasing. Improvements in plant sanitation and screening for salmonella loaded carcasses have proven to be inadequate to reduce the incidence of human salmonellosis. Also, the presence of salmonella in minced meat such as hamburger commonly occurs, necessitating careful cooking of the meat to avoid food poisoning.

In the prior art it is known to use $CO_2$ in sterilization processes. U.S. Pat. No. 3,454,406 issued Jul. 8, 1969 discloses a process in which $CO_2$ is used in combination with a neutralizing and heating process to destroy bacteria. In a food product, slightly acidified by $CO_2$, the thermal resistance of spores is reduced; thus a lesser degree of heating is required to kill bacteria than would otherwise be the case.

U.S. Pat. No. 4,361,536 issued Nov. 30, 1982 relating in particular to a method for sterilizing contact lenses discloses a process employing $CO_2$ gas under pressure, 1.5 atmospheres in this disclosure, followed by a vacuum. It is noted in accordance with this invention that the $CO_2$ gas displaces oxygen thereby selectively deactivating only aerobic bacteria. Deactivation of aerobic bacteria is further enhanced by providing a sudden transition from positive pressure to a molecular vacuum. However, salmonella is a facultative anaerobe, that is, it grows aerobically or anerobically, and thus is not significantly effected by an oxygen void environment.

It is disclosed in U.S. Pat. No. 1,524,494 issued Jan. 27, 1925 that a positive acid reaction is created when $CO_2$ gas is purged through moist corks. Carbonic acid, produced as $CO_2$ gas combines with water, will destroy exposed aerobic and anerobic pathogens if the pH level is low enough and if sufficient time is allowed. Salmonella will not be totally eliminated however, under the atmospheric operating conditions described in this patent.

It is a principal object of the present invention to provide a simple and efficient process for sterilizing meat and poultry, specifically meat and poultry containing salmonella bacteria.

It is a further object of the present invention to kill a wide range of aerobic and anerobic microorganisms.

A still further object of the present invention is the provision of a process to sterilize fresh poultry while concurrently tenderizing said poultry.

STATEMENT OF THE INVENTION

In accordance with the process of the present invention, meat and poultry may be economically sterilized to kill salmonella bacteria, substantially reducing salmonellosis food poisoning in humans. By subjecting meat and poultry to one or more cycles of exposure to $CO_2$ gas under pressure, whereby carbonic acid is formed to saturate the meat, and rapidly depressuring the saturated poultry, a bactericide effective against salmonella is provided. The forming of a vacuum before each introduction of $CO_2$ gas is believed to remove any air present and to facilitate the penetration of $CO_2$ gas throughout the meat and poultry carcass. Although the description of the process of the invention will proceed with reference to the treatment of poultry, it will be understood the description will apply also to the treatment of meat.

In its broad aspect, the process of the invention for sterilizing poultry comprises the steps of placing poultry carcasses or parts thereof in a pressure vessel, introducing gaseous $CO_2$ under pressure, up to about 400 psig, to said vessel for a time sufficient to penetrate and to substantially permeate said carcasses, and rapidly releasing the pressurized $CO_2$. Preferably, air is withdrawn from the pressure vessel prior to supplying the gaseous $CO_2$. The introduction of gaseous $CO_2$ followed by instant release of pressurized $CO_2$ can be repeated for several cycles, e.g. up to five cycles. The $CO_2$ can be withdrawn to create a vacuum between cycles.

More particularly, the process of the invention for sterilizing and tenderizing poultry and meat comprises placing said poultry or meat in a pressure vessel, withdrawing air in said pressure vessel to create a vacuum, introducing gaseous $CO_2$ under pressure to create a $CO_2$ pressure in said pressure vessel in the range of about 350 to 400 psig, maintaining said pressure for a time sufficient for the $CO_2$ gas to form carbonic acid with moisture in the poultry or meat and to substantially penetrate and permeate the poultry or meat, and rapidly depressurizing the pressure vessel.

BRIEF DESCRIPTION OF THE DRAWING

The process of the present invention will now be discussed with reference to the accompanying drawing, in which.

DESCRIPTION OF THE PREFERRED EMBODIMENT

Figure 1:
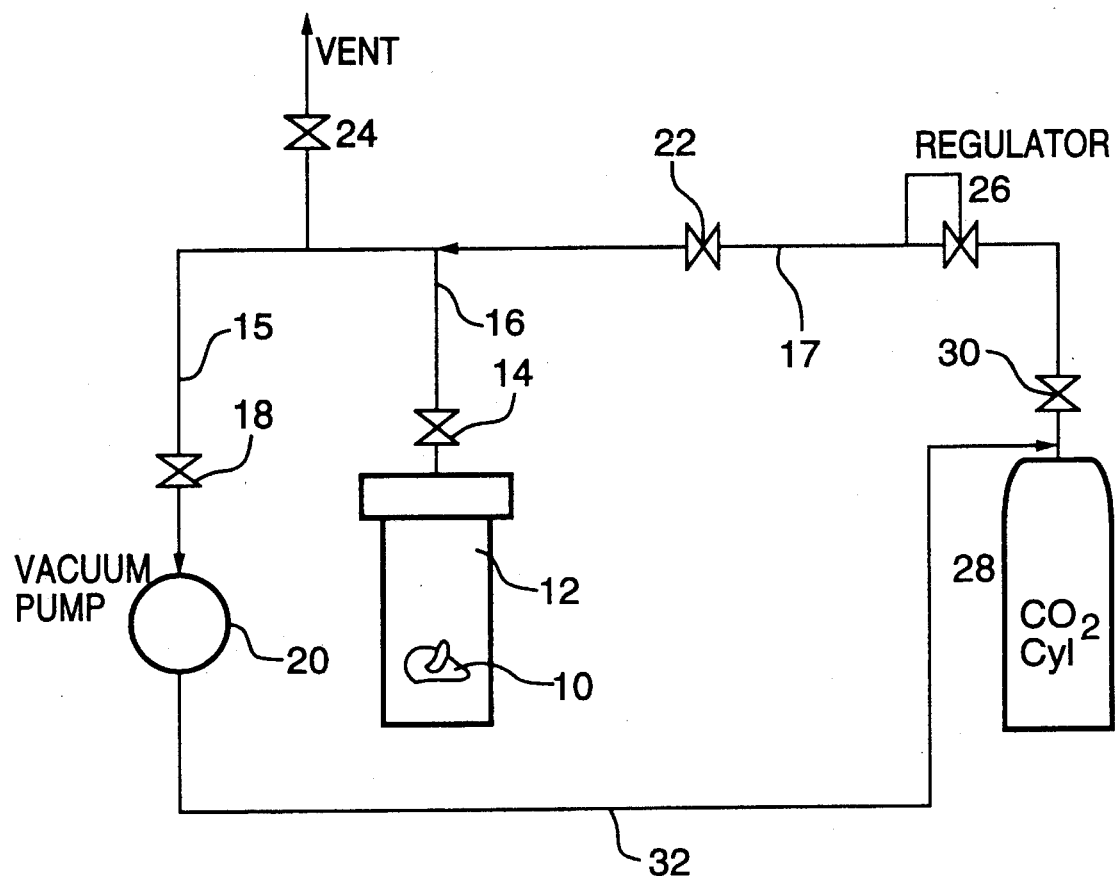
FIG. 1 is a schematic representation of a typical apparatus used in accordance with the process of the invention.

With reference now to FIG. 1, a poultry product such as a chicken or chicken parts depicted by numeral 10 is contained within an autoclave-type pressure vessel 12. A vacuum pump 20 is in communication with said pressure vessel 12 via a fluid circuit 15, 16. A $CO_2$ source, typically a $CO_2$ cylinder 28, is also in communication with said pressure vessel 12 via fluid circuit 16, 17. Pressure regulator 26 is included in fluid circuit 17 to provide a predetermined $CO_2$ pressure supply to the pressure vessel 12. Stopcocks 14, 18 and 22 are provided to allow isolation of said vacuum pump 20, pressure vessel 12 and $CO_2$ cylinder 28 respectively in the fluid circuit, to be described. A further stopcock 24 is provided to allow venting of the fluid circuit 16 for discharge of $CO_2$ gas to the atmosphere or possible recycling of spent gases within the fluid circuit 16 and pressure vessel 12.

In accordance with a preferred embodiment of the process of the invention, one or more complete poultry carcass 10 or poultry parts contaminated with salmonella culture or the like organism is placed within the pressure vessel 12. In a practical application a large quantity of poultry, perhaps many thousand kilograms, would be processed in a suitably sized pressure vessel 12.

Stopcock 14, the isolation valve for the pressure vessel 12, will remain open in the description as follows but would be closed and opened as practical application dictates.

Stopcock 18 is opened and vacuum pump 20 is activated, until all the air is substantially evacuated from the pressure vessel 12 via fluid circuit 15, 16. Stopcock 22 and discharge valve 30 of $CO_2$ cylinder 28 are then opened and $CO_2$ gas is introduced under a pressure up to about 400 psig to the pressure vessel 12 via pressure regulator 26. This pressure is maintained for a time sufficient, preferably up to about 15 minutes, to allow $CO_2$ to form carbonic acid with moisture in the poultry and to substantially permeate the poultry.

It may be preferred to immerse the poultry and poultry carcasses in water, particularly if the poultry is dry, to ensure moisture is present for the formation of carbonic acid.

The pressure regulator 26 is set to provide $CO_2$ gas under pressure preferably in the range of 350 to 400 psig to the pressure vessel 12. $CO_2$ combines with moisture in the poultry to create carbonic acid which at a pH level below about 4, preferably at a pH of about 3.5, is bactericidal to salmonella. Any exposed salmonella bacteria thus will be weakened or killed.

Stopcock 24 is then momentarily opened for rapid pressure release of the $CO_2$ gas to atmosphere. Alternatively, the $CO_2$ gas may be evacuated by opening stopcock 18 and activating vacuum pump 20 for recycle of the gas to gas supply cylinder 28 by line 32.

As the pressure decreases, microscopic $CO_2$ bubbles rapidly form throughout the meat. Cellular membranes are subjected to considerable strain, and subsequently ruptured or weakened, thus exposing otherwise protected bacteria to the carbonic acid while tenderizing the poultry. It is also believed that considerable mechanical damage is done to the bacteria as a result of the rapid increase in size of the bubbles.

The aforementioned cycle can be repeated a plurality of times as necessary, e.g. up to five cycles, until the salmonella is substantially destroyed.

The process of the invention will now be described with reference to the following non-limitative examples.

EXAMPLE 1

Portions of 11 g of fresh chicken (breast & skin) were inoculated with 0.1 ml of a salmonella culture, i.e. 24 hour *Salmonella enteritidis*. The infected portions were transferred to sterile stainless steel containers containing 90 ml of sterile saline solution. The containers were pressurized to 100 psig with $CO_2$ and kept in an ice bath (32 ±2° F.) for 20, 30, 40 and 50 minutes. After treatment time, the pressure was released and samples transferred to sterile blenders.

Proper dilutions were prepared and the samples were assayed for salmonella, Total Plate Count (TPC), coliform and yeast & mould.

The results are summarized in Table 1 below.

TABLE 1

| Time (min) | Salmonella | TPC | Coliform | Yeast & Mould |
|---|---|---|---|---|
| (Average of two results of Sets A & B given) | | | | |
| 0 | $2.43 \times 10^6$ | $3.4 \times 10^7$ | TNC* | 10 moulds > 1000, TNC yea |

TABLE 1-continued

| Time (min) | Salmonella | TPC | Coliform | Yeast & Mould |
|---|---|---|---|---|
| (Average of two results of Sets A & B given) | | | | |
| 20 | $1.7 \times 10^6$ >300000** | $5.0 \times 10^6$ | <10 | 10 moulds, 60 Yeast |
| 30 | >30000 | $1.7 \times 10^6$ | <10 | Yeast 40 |
| 40 | 15430 | $1.4 \times 10^4$ | <10 | Yeast <10, 150** |
| 50 | <10 | $1.13 \times 10^3$ | <10, 880 | Yeast 10, 80** |

*TNC = too numerous to count
**Results of Set A and Set B did not Agree, therefore both reported.

The killing rate for salmonella was satisfactory and killing was complete within 50 minutes. However, linearity could not be determined because the results of 20 and 30 minutes treatment could not be evaluated.

Initial count of the TPC was high, however, a reduction of number in 1 logantimic order/10 minutes was observed. Complete killing was not achieved with 50 minutes treatment.

Yeast seemed to be more resistant to the treatment than mould. Although the initial count of 10 moulds was found at 0 time, no mould survived after 20 minutes. All coliforms were destroyed within 20 minutes.

Most of the results of the duplicates (set A and B) agreed. However, as shown in the table, some of the results did not agree. The reason is most probably due to contamination of the mouth of the container, or some organisms were attached at the walls of the containers above the liquid level, and therefore not in direct contact with acid solution.

EXAMPLE 2

Portions of 11 g chicken pieces were inoculated with the 24 hour salmonella culture of the type used in Example 1 to yield an approximate population of $10^6$/g. One sample was inserted aseptically into each of eight stainless steel pressure containers connected together with stainless steel tubing. Each container was fit with an inlet and an outlet valve and was connected through a manifold to a $CO_2$ gas cylinder and a vacuum system in the manner illustrated in FIG. 1 for selectively pulling a vacuum or feeding $CO_2$ gas to a desired container.

Air initially in the containers was evacuated to create a vacuum and the containers pressurized to 300 psig for 15 minutes up to two hours, as indicated, followed by rapid depressurizing. This cycle was repeated with and without pulling a vacuum.

The salmonella culture was diluted with saline solution to read approximately 0.2 absorbence of 650 mm, and was plated on stainless steel and Mackonky agar to determine the actual population.

Test results are shown in Table 2 below.

| Container Number | S. S. Agar* Count/g | % Kill | Mac. Agar** Count/g | % Kill | Total Treatment Time | Remarks |
|---|---|---|---|---|---|---|
| 0 Time Salmonella culture | $2.4 \times 10^8$ $2.8 \times 10^8$ | | $1.6 \times 10^{10}$ $8.5 \times 10^9$ | | zero | Population of Salmonella culture used |
| #7 | $2.0 \times 10^7$ | | $3.8 \times 10^9$ | | zero | No treatment |
| #2 | <10 | 100% | <10 | 100% | 75 minutes | Vacuum pulled, pressured to 300 psig, |
| #2 | <10 | 100% | <10 | 100% | | 15 min. carbonation time, |
| #8 | <10 | 100% | $2.0 \times 10^5$ | <99% | | vacuumed after |
| #8 | <10 | 100% | $3.0 \times 10^5$ | <99% | | each carbonation cycle. Total 5 carbonation cycles. |
| #3 | <10 | 100% | <10 | 100% | 75 minutes | Vacuum pulled, |
| #3 | <10 | 100% | <10 | 100% | | pressure to 300 psig |
| #4 | <10 | 100% | $7.0 \times 10^5$ | <99% | | for 15 min. After |
| #4 | <10 | 100% | $1.3 \times 10^6$ | <99% | | each cycle, vented to atmosphere only. Total 5 carbonation cycles. |
| #5 | <10 | 100% | $1.0 \times 10^5$ | <99% | 120 minutes | One cycle of pulling |
| #5 | <10 | 100% | $5.6 \times 10^6$ | <99% | | vacuum pressure with $CO_2$ to 300 |
| #6 | <10 | 100% | <10 | 100% | | psig for 2 h. Vented to |
| #6 | <10 | 100% | $2 \times 10^5$ | <99% | | vacuum at the end of treatment. |
| #1 | <10 | 100% | <10 | 100% | 60 minutes | Same as 5 and 6 in |
| | <10 | 100% | <10 | 100% | | Treatment. Time 1 h. |

The process of the invention provides a number of important advantages. Since all commercially sold $CO_2$ is recovered from existing industrial processes and is a naturally-occurring benign compound, no toxic chemicals are introduced to the environment and ecological system. The $CO_2$ gas accordingly may be released to the atmosphere. The process as described may be easily handled on a large scale by mechanical handling equipment to effectively kill salmonella bacteria as well as yeast, mould and coliform bacteria in poultry and meat. Also, the weak carbonic acid formed together with the mechanical effect of the $CO_2$ bubble formation within the poultry and meat has a tenderizing effect on the poultry and meat.

It will be understood that modifications can be made in the embodiment of the invention described herein without departing from the scope and purview of the invention as defined by the appended claims.

We claim:

1. A process for sterilizing and tenderizing meat or poultry carcasses or poultry parts comprising placing said meat or poultry carcasses or poultry parts in a pressure vessel, withdrawing air in said pressure vessel to create a vacuum and subjecting said meat or poultry carcasses or poultry parts to one or more cycles of exposure to gaseous $CO_2$ under pressure of up to about 400 psig for a time sufficient for the $CO_2$ to penetrate and to permeate said meat or poultry carcasses or poultry parts, and rapidly releasing the pressurized $CO_2$.

2. A process as claimed in claim 1, in which the cycle is repeated up to five times.

3. A process as claimed in claim 2, in which $CO_2$ gas is withdrawn to create a vacuum prior to each introduction of gaseous $CO_2$ under pressure.

4. A process as claimed in claim 1, in which gaseous $CO_2$ is introduced at a pressure in the range of about 350 to about 400 psig to the pressure vessel, and the said pressure maintained for up to about 15 minutes.

5. A process as claimed in claim 1, in which the process is conducted at a temperature in the range of 32° to 34° F.

6. A process as claimed in claim 1, in which the released $CO_2$ gas is recycled.

7. A process as claimed in claim 1, in which the $CO_2$ gas is rapidly released to the atmosphere.

8. A process as claimed in claim 1, immersing the meat or poultry carcasses or poultry parts in water prior to subjecting said meat or poultry carcasses or poultry parts to $CO_2$ under pressure.

9. A process for sterilizing and tenderizing poultry comprising placing said poultry in a pressure vessel, withdrawing air in said pressure vessel to create a vacuum, introducing gaseous $CO_2$ under pressure to create a $CO_2$ pressure in said pressure vessel in the range of about 350 to 400 psig, maintaining said pressure for a time sufficient for the $CO_2$ gas to form carbonic acid with moisture in the poultry to substantially penetrate and permeate the poultry, and rapidly depressurizing the pressure vessel.

* * * * *